US009879967B2

(12) United States Patent
Merlo et al.

(10) Patent No.: US 9,879,967 B2
(45) Date of Patent: Jan. 30, 2018

(54) METHOD FOR COMPENSATING MEASUREMENT ERRORS DUE TO THERMALLY INDUCED STRUCTURAL DEFORMATIONS IN A COORDINATE MEASUREMENT MACHINE

(71) Applicant: HEXAGON METROLOGY S.p.A., Moncalieri (IT)

(72) Inventors: Lorenzo Merlo, Turin (IT); Emanuele Ricci, Turin (IT)

(73) Assignee: HEXAGON METROLOGY S.P.A., Moncalieri (IT)

( * ) Notice: Subject to any disclaimer, the term of this patent is extended or adjusted under 35 U.S.C. 154(b) by 382 days.

(21) Appl. No.: 14/605,025

(22) Filed: Jan. 26, 2015

(65) Prior Publication Data

US 2015/0211835 A1    Jul. 30, 2015

(30) Foreign Application Priority Data

Jan. 27, 2014   (EP) .................................... 14152748

(51) Int. Cl.
  *G01B 5/00*   (2006.01)
  *G01B 21/04*  (2006.01)
(52) U.S. Cl.
  CPC ......... *G01B 5/0014* (2013.01); *G01B 21/045* (2013.01)
(58) Field of Classification Search
  None
  See application file for complete search history.

(56) References Cited

U.S. PATENT DOCUMENTS

2005/0243969 A1* 11/2005 Andrews ................ H05G 1/025
                                                        378/119
2010/0299094 A1   11/2010 Hsu

FOREIGN PATENT DOCUMENTS

EP      1 536 205 A2    6/2005
WO   2013/021157 A1    2/2013

OTHER PUBLICATIONS

Kornel F. Ehmann, International Assessment of Research and Development in Micromanufacturing, Oct. 2005, 280 pages.*
Lin Zhang, Thermal deformation of cryogenically cooled silicon crystals under intense X-ray beams: measurement and finite-element predictions of the surface shape, Apr. 7, 2013, 14 pages.*
European Search Report dated May 14, 2014 in application No. 14 15 2748.

* cited by examiner

*Primary Examiner* — Tung Lau
(74) *Attorney, Agent, or Firm* — Maschoff Brennan

(57) ABSTRACT

A method for compensating measurement errors caused by the deformation of a component defining a slide axis in a measurement machine, comprising the steps of calculating the curvature of the component as a function of the difference between the current temperature Tc and a reference temperature Tr at which the geometric compensation map of the machine has been obtained, calculating correction values for the compensation parameters stored in the compensation map as a function of the curvature, and updating the compensation map with these correction values.

9 Claims, 3 Drawing Sheets

METHOD FOR COMPENSATING MEASUREMENT ERRORS DUE TO THERMALLY INDUCED STRUCTURAL DEFORMATIONS IN A COORDINATE MEASUREMENT MACHINE

The present invention refers to a method for compensating measurement errors due to thermally induced structural deformations in a coordinate measurement machine.

BACKGROUND OF THE INVENTION

As is known, coordinate measurement machines comprise members movable along coordinate axes for the purposes of moving a measuring sensor in a measurement volume. Typically, the movable members are constituted by a first carriage movable along a first axis, a second carriage carried by the first carriage and movable with respect thereto along a second axis orthogonal to the first one, and a spindle carried by the second carriage and movable with respect thereto along a third axis orthogonal to the first two.

In particular, the present method relates to the compensation of measurement errors due to the thermal deformation of the machine structural components that form the guideways for the movable members. These components are characterized by an elongated prismatic shape with a longitudinal dimension that is significantly larger than the others.

The components may constitute the movable part or the fixed part of the relevant slide axis.

Some non-limitative examples of these components are constituted, for example, by:

the vertical axis or spindle of a gantry or cantilever machine;
the horizontal axis or arm of a horizontal arm machine;
the vertical axis or upright of a horizontal arm machine.

Typically, as shown in FIG. 1, the components 1 that form the slide axes in coordinate measurement machines, for example of the previously indicated type, are constituted by a structural element 2 and by one or more guide elements 3 (for example rails for recirculating-ball pads or rollers or guides for pneumostatic pads) mounted thereon. The structural element 2 and the guide element(s) 3 have an elongated prismatic shape and substantially the same length. The structural element 2 generally has a larger cross-sectional size, while the guide elements 3 are slimmer and more flexible.

The joint between the structural element 2 and the guide element(s) 3 is generally provided by threaded connections 4 sized in such a way that, for practical purposes, the component 1 may be considered as a single piece from the structural standpoint.

The assembled component 1 has a constant section along the longitudinal direction for substantially its entire length.

Depending on the position of the guide elements 3 on the section, the section may be asymmetric and the barycentre of the sections of the guide elements 3 might not coincide with the neutral axis of the section of the structural element 2.

Examples of asymmetric sections are shown in FIGS. 2 and 3: in FIG. 2, the structural element 2 is constituted by a hollow, quadrangular section beam and the guide elements are applied on a face of the structural element 2, along parallel edges of the latter; in FIG. 3, the guide elements 3 are arranged on two opposite faces, along edges adjacent to a third face.

In general, the structural element 2 and the guide element(s) 3 are made of different materials or, in the case where they are made of the same material (steel for example), the properties of the material may still be different due to different manufacturing technologies and the required functional characteristics.

In particular, the materials may differ with regard to the linear thermal expansion coefficient (CTE).

In use, the component is subjected to temperature changes within the range of permissible conditions for using the machine (for example, 15-35° C.). The temperature changes are intended as temporal variations; spatial temperature gradients along the component are not considered here and their effects might possibly overlap those of the temporal variations.

A temperature change causes a differential length change length between the structural element 2 and the guide elements 3, due to the different linear thermal expansion coefficients. It follows that, due to the asymmetry and non-correspondence to the neutral axis, as well to as the integral connection between the structural element 2 and the guide elements 3, component deformation is generated, in particular a curvature thereof, and therefore geometrical changes in the axis (FIG. 4), which induce measurement errors.

SUMMARY OF THE INVENTION

The object of the present invention is to provide a method for compensating the above-stated measurement errors.

The above-stated object is achieved by the present invention in so far as it relates to a compensation method according to claim 1.

BRIEF DESCRIPTION OF THE DRAWINGS

For a better understanding of the invention, hereinafter a preferred embodiment is described with reference to the attached drawings, where.

DETAILED DESCRIPTION OF THE INVENTION

Figure 1:
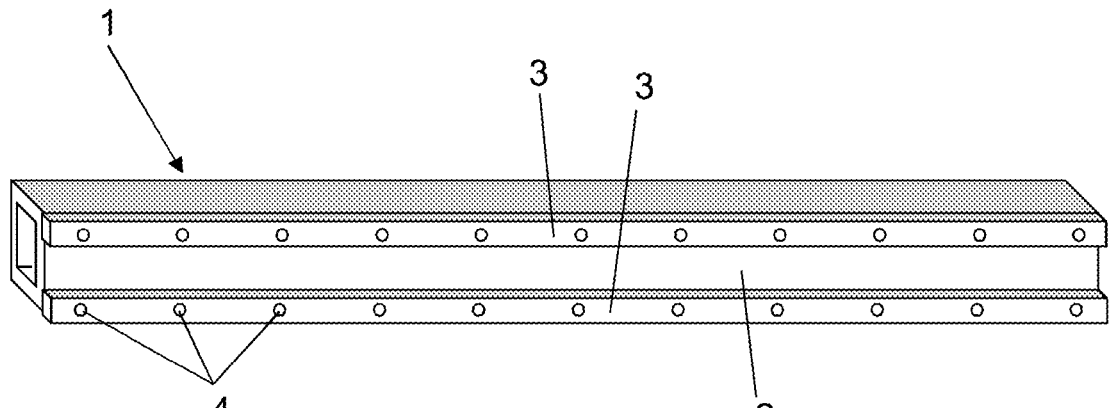
FIG. 1 is a perspective view of a first embodiment of a component defining a slide axis of a measurement machine.
Figure 2:
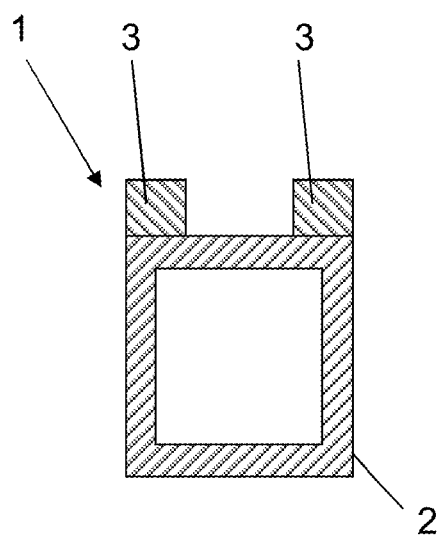
FIG. 2 is a cross-section of the component in FIG. 1.
Figure 3:
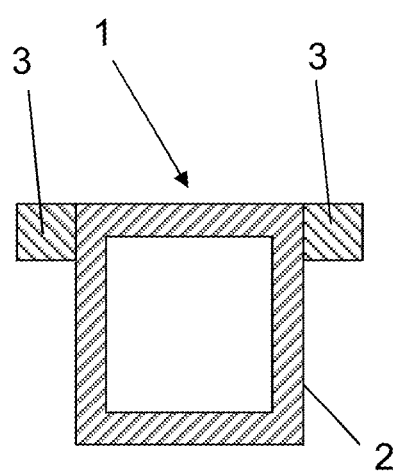
FIG. 3 is a cross-section of an alternative embodiment of the component in FIG. 2.
Figure 4:
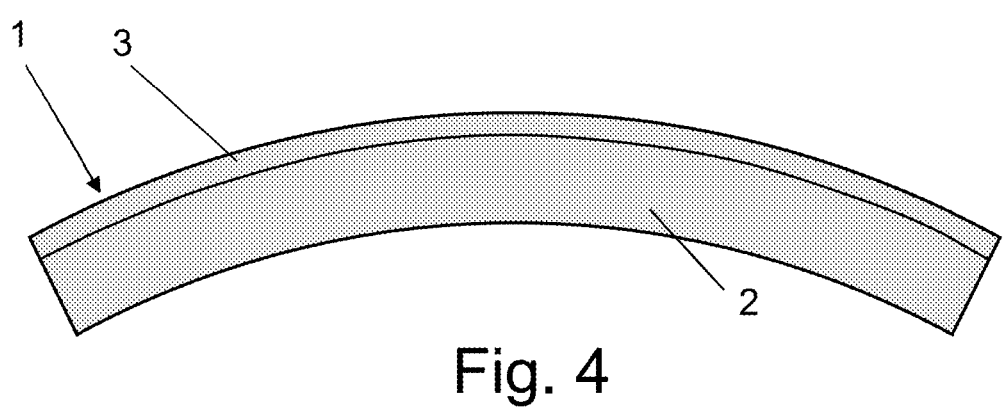
FIG. 4 is a diagram showing the thermally induced deformation of the component.

The present invention relates to a method for obviating the loss of precision caused by the thermal distortion effect on the components 1 that form the slide axes in coordinate measurement machines and which are constituted by a structural element 2 and by one or more mounted guide elements 3, such as the components described above with reference to FIGS. 1 to 3 for example.

According to the present invention, the curvature of the component may be compensated for by adding a correction factor to the geometric compensation algorithms normally implemented on the measurement machine.

The correction is based on knowledge of:
the temperature change of the component with respect to an initial reference situation, obtained from a measurement via a temperature sensor positioned on the component under consideration or, when this is not possible, positioned on the machine so as to provide a temperature corresponding to that of the component;
the law of proportionality between temperature and curvature; in a first approximation, this law may be considered linear and may be obtained experimentally, subjecting a sample constituted by one or more examples of the component under consideration to testing with structural analysis, or via structural calculation, taking the following factors into account:
the difference between the linear thermal expansion coefficients (CTE) of the structural and guide elements;
the shape of the structural and guide elements; and
the elastic characteristics of the materials.

Compensation takes placed in a manner similar to other types of thermal/geometric compensation generally implemented on the machine.

Figure 5:
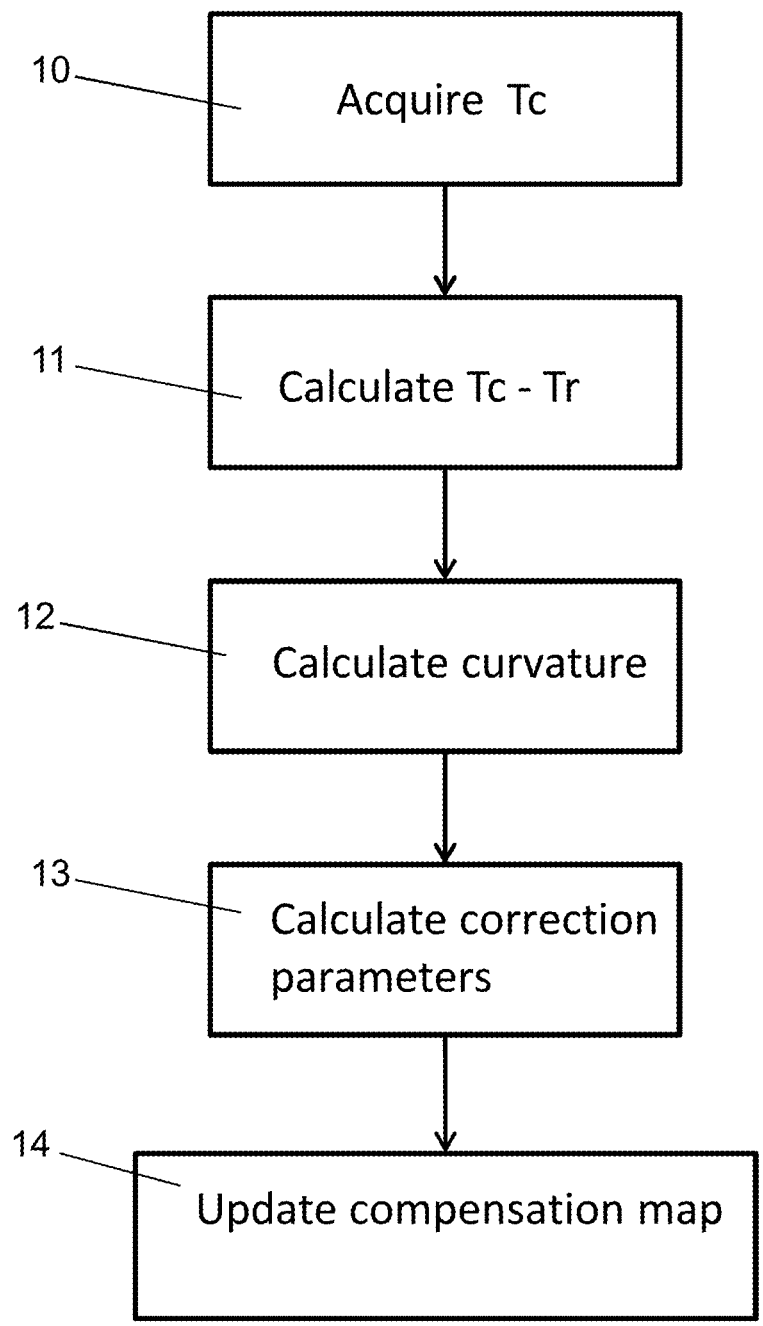
FIG. 5 is a flow chart of the method of the invention.

As shown in the flow chart in FIG. 5, the method comprises the following steps, implemented in a control unit forming part of the machine or in an external computer connected to the machine:
acquiring the current temperature value Tc (block 10);
calculating the temperature change Tr with respect to the reference temperature stored at the time of the geometric mapping of the machine (block 11);
calculating the curvature of the component via the above-described law of proportionality (block 12);
calculating correction parameters compatible with the geometric compensation model already implemented and in use (block 13): here, the correction parameters are intended as adjustments to the parameters acquired at the time of the geometric mapping of the machine and stored in the compensation map; and
updating the compensation map (block 14).

Assuming that the structural element 2 and the guide elements 3 are considered as beams reciprocally constrained at the two ends by interlocking joints, curvature may be calculated as described below.

The guide elements 3 may be considered as a single beam element, having the following elastic characteristics:
E1=modulus of elasticity of the material
A1=cross-section area
J1=cross-section flexural moment of inertia
Similarly, the structural element 2 may be considered as a beam element having the following elastic characteristics:
E2=modulus of elasticity of the material
A2=cross-section area
J2=cross-section flexural moment of inertia
In addition:
d=distance between the neutral axes of the structural element 2 and the guide elements 3;
Delta_T=temperature change with respect to the initial reference condition;
Delta_CTE=difference between the linear thermal expansion coefficients of the two materials;
The bending of the component may be expressed with the following theoretical formula:

$$R = \frac{\frac{Delta\_T * Delta\_CTE}{d}}{1 + \left(\frac{E1*J1 + E2*J2}{d^2}\right) * \left(\frac{1}{E1*A1} + \frac{1}{E2*A2}\right)} \quad [1]$$

or, more in general, with the following expression:

$$R = SF * Delta\_T * Delta\_CTE * CF \quad [2]$$

where SF is a structural calculation factor that may correspond to the analytical expression:

$$SF = \frac{\frac{1}{d}}{1 + \left(\frac{E1*J1 + E2*J2}{d^2}\right) * \left(\frac{1}{E1*A1} + \frac{1}{E2*A2}\right)} \quad [3]$$

contained in formula [1] or derived from numerical simulations, for example, from structural analysis using the finite element method; and CF is an experimental correction factor, the theoretical value of which is 1 (it may be noted that expressions [1] and [2] coincide in the case where SF is defined by expression [3] and CF is equal to 1).

In the case where the component under consideration is, for example, the spindle of a gantry or cantilever machine and movable along its vertical axis Z, the thus calculated bending may be used to calculate the rotation and displacement it produces on the connection flange of the probe, and consequently the measurement errors it induces.

Figure 6:
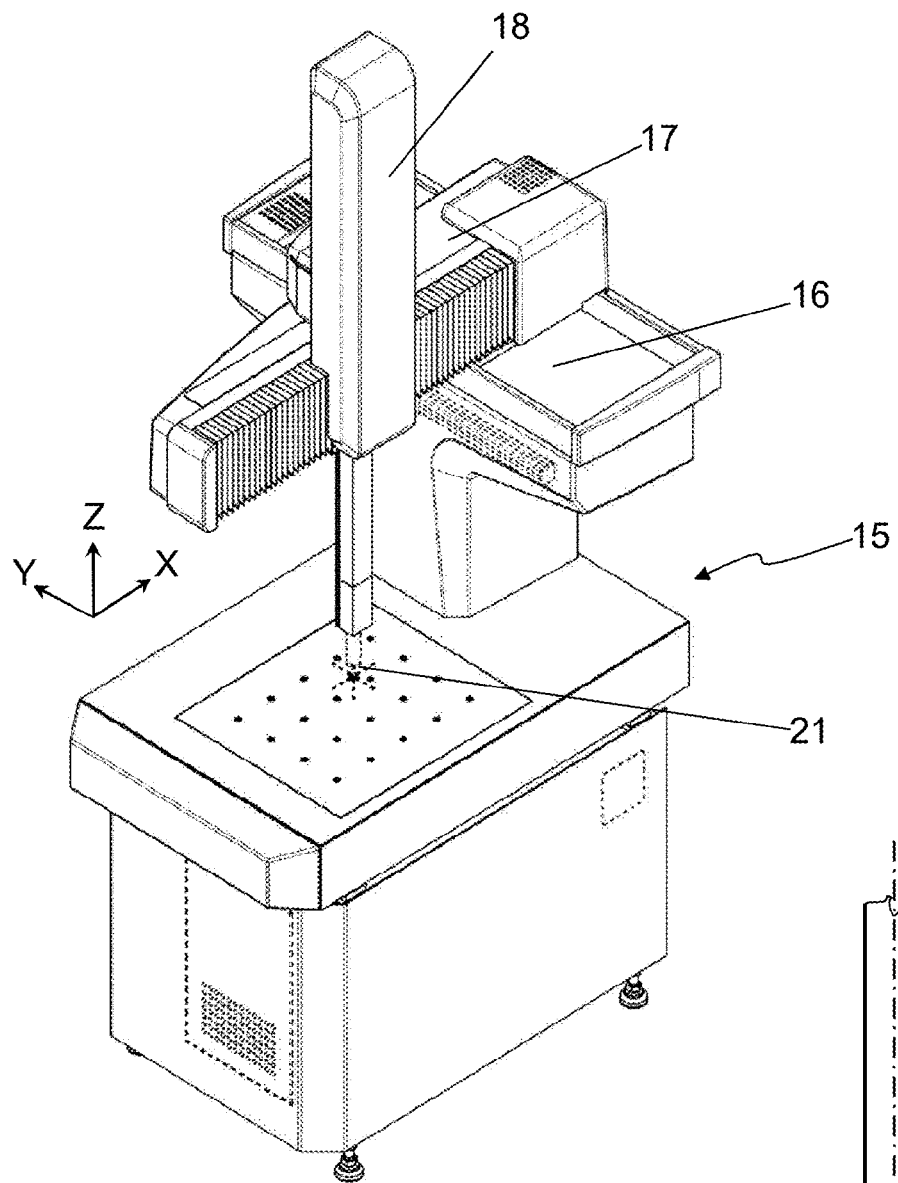
FIG. 6 is a perspective view of a measurement machine to which the compensation method of the present invention is applied.

For example, FIG. 6 shows a cantilever machine 15 having a T-shaped support structure 16 defining a horizontal axis Y, and comprising:
a horizontal arm 17 cantilevered from the support structure, movable with respect to the latter along the Y-axis and defining a horizontal axis X;
a carriage 18 carried by the arm 17 and movable on the latter along the X-axis; and
a spindle 19 carried by the carriage and arranged with its own axis Z vertical.

Figure 7:
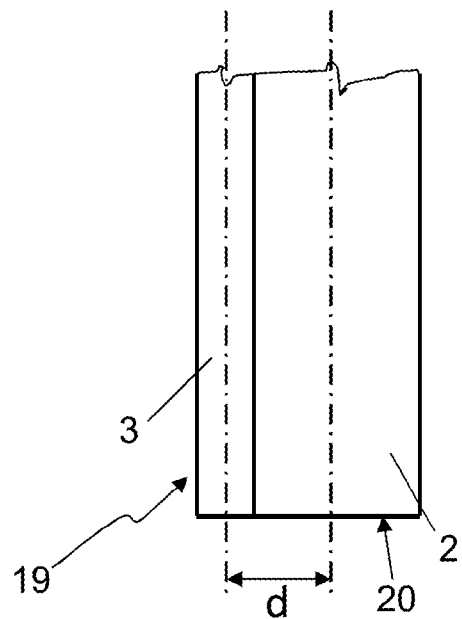
FIG. 7 is an enlarged front view of a detail of the machine in FIG. 6.

The spindle 19 comprises a structural element 2 and guide elements 3 (see the enlarged detail in FIG. 7), and is the component whose curvature induced by the thermal differential expansion between the structural element 2 and the guide elements 3, as described above, is to be compensated. In the case under consideration, the neutral axis of the structural element 2 and the beam element equivalent to the guide elements 3 are staggered from one another by a distance d in the direction parallel to the Y-axis, and the bending of the spindle 19 thus takes place in the Z-Y plane.

The lower end of the spindle 19 defines a flange 20 to which a probe 21 may be fastened, and for which it is therefore necessary to calculate the rotation and displacement due to the effect of the spindle 19 bending at the current Z coordinate.

The angle of rotation Rzy at the flange 20 is defined by the expression:

$$Rzy = Rzy\_m * (Z - Zv), \quad [4]$$

where:
Rzy_m is the mean curvature on the ZY plane calculated by means of [1] or [2]; and
Zv is a dimensional characteristic of the machine, dependent on the modes of constraining the spindle 19 and representative of a height at which the rotation of the flange is null (joint point).

The displacement at the flange 20 is defined by the expression:

$$Ly = Rzy\_m * (Z - Zv)^2 / 2 * Ly\_CF, \quad [5]$$

where Ly_CF is an experimental correction factor, the theoretical value of which is equal to 1.

The calculated angle and displacement are inserted in the compensation formulas, adding them to those present in the geometric compensation map of the machine. The corrections to be made to the coordinates of the measured points are then calculated.

The described calculation is cyclically updated during operation of the machine, and preferably in a substantially continuous manner, so as to correct the measured coordinates in real time.

Compensation takes place in a straightforward manner and, in the case where a temperature sensor already present on the machine is used, does not require additional components with respect to a conventional machine.

The invention claimed is:

1. A method
comprising the step of:
compensating measurement errors caused by the geometric deformation of a component (1; 19) of a measurment machine, said component defining a slide axis of the machine and comprising a structural element (2) and at least one guide element (3) assembled together, the machine being equipped with a control unit and a geometric compensation map obtained at a reference temperature (Tr) and in which geometric compensation parameters are stored, wherein said step includes the steps of:
acquiring a current temperature value (Tc);
calculating the difference between the current temperature (Tc) and the reference temperature (Tr);
calculating at least one deformation parameter correlated with the deformation of the component (1) as a function of said temperature difference;
calculating correction values for the compensation parameters stored in the compensation map as a function of said at least one deformation parameter; and updating the compensation map with said correction values.

2. A method as claimed in claim 1, characterized in that said at least one deformation parameter is a curvature of said component.

3. A method as claimed in claim 1, characterized in that said at least one deformation parameter is calculated by means of a law obtained through structural calculation.

4. A method as claimed in claim 1, characterized in that said at least one deformation parameter is calculated by means of a law obtained experimentally.

5. A method according to claim 3, characterized in that said law is linear.

6. A method according to claim 1, wherein the component of the machine is a spindle (19) equipped with a flange (20) for the connection of a probe (21), said deformation parameters comprising a rotation and a displacement of said flange (20).

7. A method according to claim 1, characterized in that said steps are performed cyclically during operation of the machine.

8. A method according to claim 1, characterized in that said steps are performed in a continuous manner.

9. A method according to claim 1, characterized in that said current temperature value is acquired by a temperature sensor positioned on said component (1; 19) or on the machine in a position such as to detect a temperature corresponding to that of said component.

* * * * *